United States Patent
Pucci et al.

(10) Patent No.: US 7,020,898 B1
(45) Date of Patent: Apr. 4, 2006

(54) MULTIUSE GLOVE

(76) Inventors: Michael A. Pucci, 3351 Wolf Creek Ct., Simi Valley, CA (US) 93063; Debra L. Underwood, 2110 N. Roosevelt Ave., Altadena, CA (US) 91001

( * ) Notice: Subject to any disclaimer, the term of this patent is extended or adjusted under 35 U.S.C. 154(b) by 0 days.

(21) Appl. No.: 10/855,194

(22) Filed: May 26, 2004

(51) Int. Cl.
*A41D 19/00* (2006.01)
(52) U.S. Cl. .......................................... 2/161.6; 2/163
(58) Field of Classification Search .............. 2/16, 2/20, 159, 160, 161.3, 161.6, 161.7, 163; 15/104.94, 167.1, 227
See application file for complete search history.

(56) References Cited

U.S. PATENT DOCUMENTS

| 1,894,413 | A | * | 1/1933 | Nenning et al. | 15/227 |
| 4,134,172 | A | * | 1/1979 | Arce | 15/167.1 |
| 4,308,860 | A | * | 1/1982 | Sanders et al. | 601/137 |
| 5,068,941 | A | * | 12/1991 | Dunn | 15/167.1 |
| 5,107,562 | A | * | 4/1992 | Dunn | 15/167.1 |
| 5,348,153 | A | * | 9/1994 | Cole | 206/361 |
| 5,579,539 | A | * | 12/1996 | Flick | 2/168 |
| 5,682,837 | A | * | 11/1997 | Courtney et al. | 119/625 |
| 5,720,048 | A | * | 2/1998 | Perez | 2/161.6 |
| 5,765,252 | A | * | 6/1998 | Carr | 15/104.94 |
| 6,401,252 | B1 | * | 6/2002 | Dean | 2/160 |
| 6,557,178 | B1 | * | 5/2003 | Hoover | 2/161.6 |
| 6,647,549 | B1 | * | 11/2003 | McDevitt et al. | 2/21 |

* cited by examiner

*Primary Examiner*—Gary L. Welch
(74) *Attorney, Agent, or Firm*—Richard S. Erbe

(57) ABSTRACT

A hand-worn article includes enclosures for thumb and fingers and a plurality of raised elements, such as bristles, extending in a generally perpendicular direction from the article. The raised elements are attached by heat sealing to the hand enclosure and may be used for a variety of applications, such as tooth brushing, cleaning, polishing, massaging and the like.

The article may be constructed as a glove, mitten, an enclosure with an extension, or a hand covering with no receptacles for fingers or thumb.

23 Claims, 5 Drawing Sheets

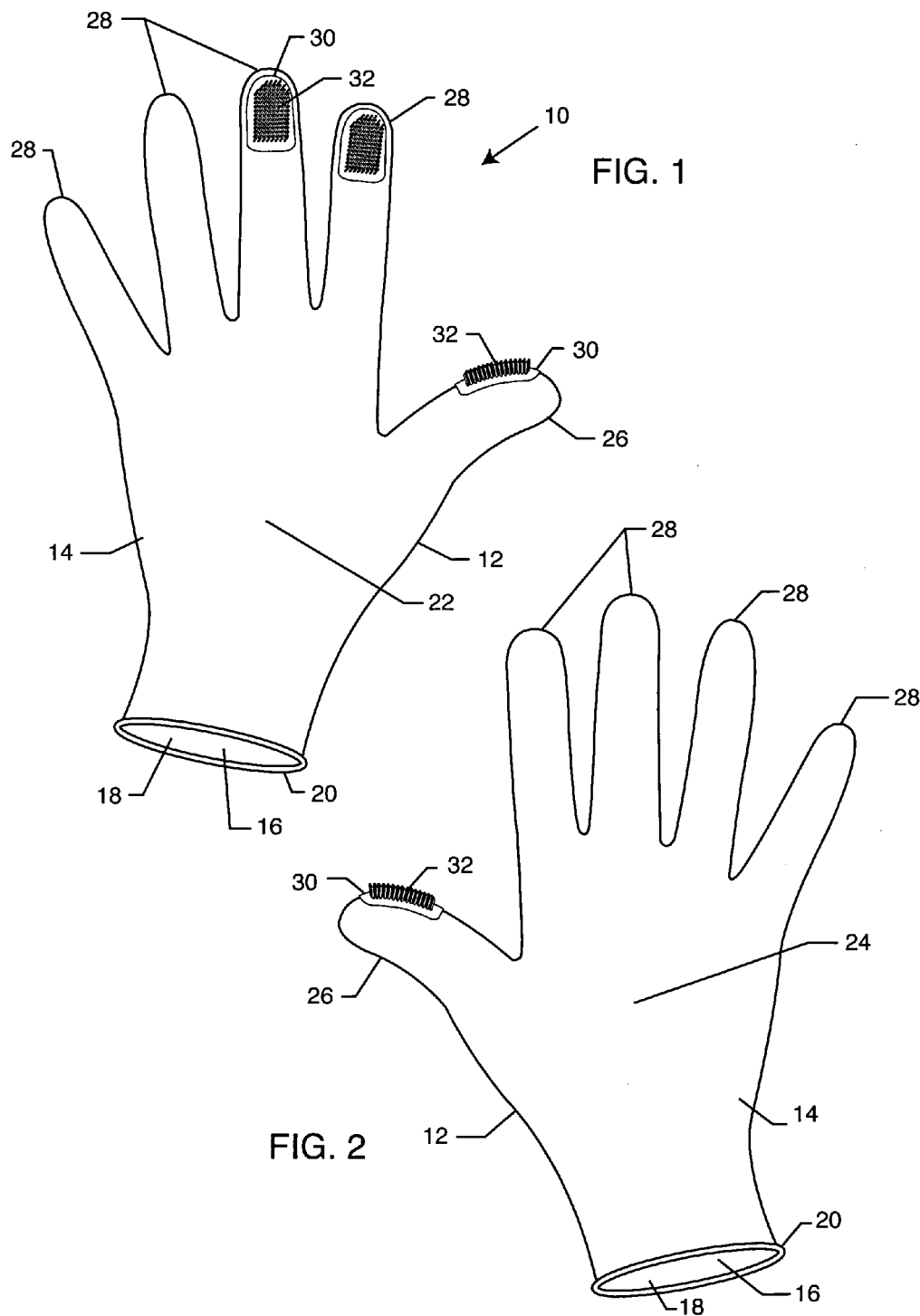

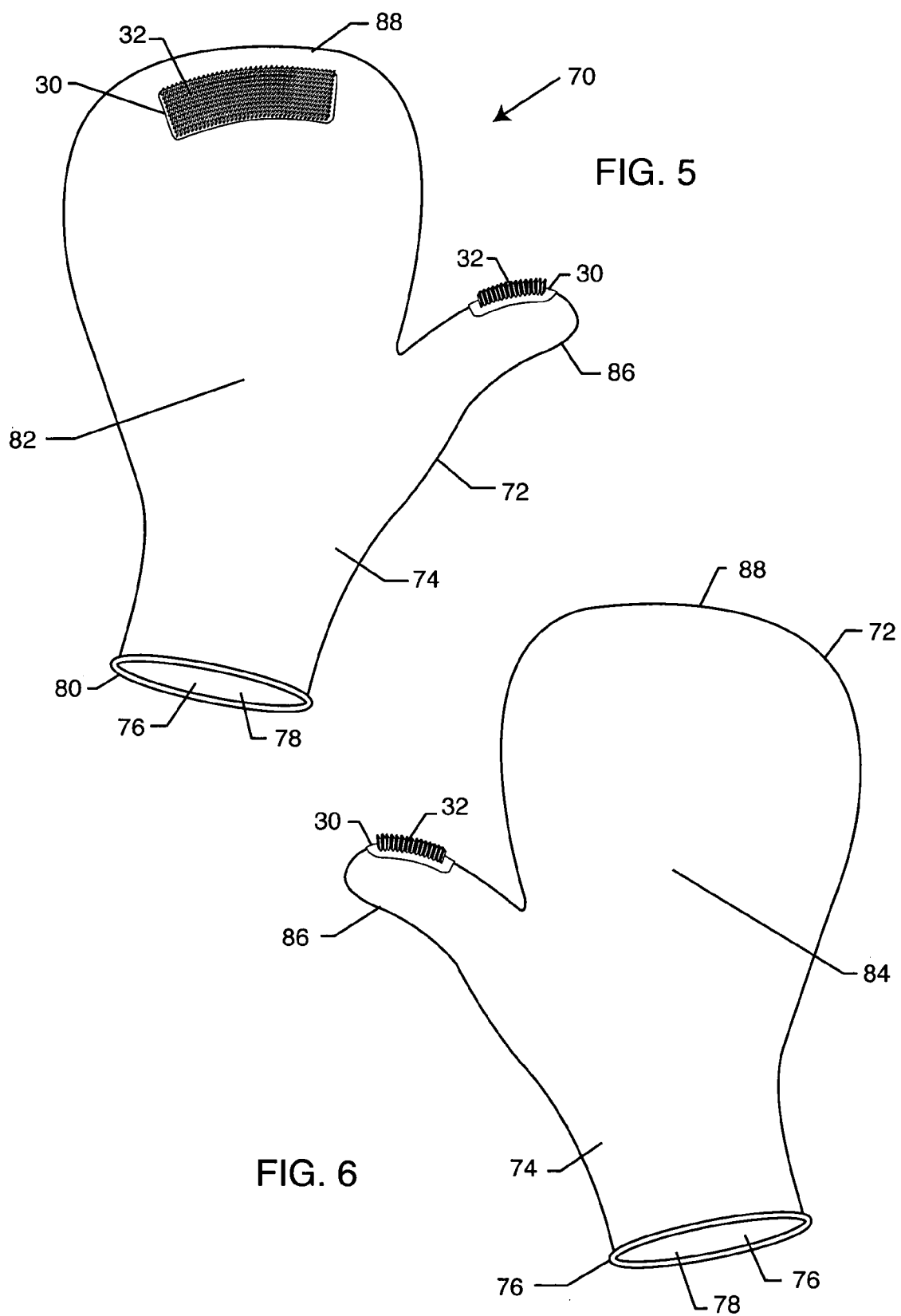

MULTIUSE GLOVE

RELATED APPLICATIONS

Not Applicable

BACKGROUND OF THE INVENTION

1. Field of the Invention

The present invention relates to hand coverings for the human hand, and more particularly to glove-like articles that can be fitted on the hand for a variety of applications, such as brushing the teeth of animals or infants, grooming, shampooing, house cleaning, hair styling, and the like.

2. General Background and State of the Art

A variety of devices have been developed for cleaning and grooming applications for use in sensitive or relatively small areas. Toothbrushes exist that can be used for cleaning the teeth of animals, such as dogs and cats, and for infants as well. Other forms of cleaning brushes, sponges, and other devices are also known. Generally, such devices have some kind of handle or base for grasping with the hand and a cleaning surface having bristles, brushes or the like for application to the area that is to be cleaned, polished, massaged or brushed.

There are some problems associated with known articles for these kinds of applications. Generally, a hand-held article for brushing, grooming, massaging, or cleaning may be dropped or dislodged, which is inconvenient and inefficient, and which may create an unsanitary condition.

Another problem associated with known devices of this type is that the user's hand may be exposed to harmful substances or injury, or, in the case of brushing teeth, to the transfer of infectious agents to and from the animal or individual whose teeth are being brushed.

There exists therefore, a need for a hand-worn cleaning or brushing article that provides protection for the user of the article that will not have the brushing part dislodged or dropped during use.

There exists a need for a hand-worn article that provides protection for the user of the device when used to brush the teeth of an animal.

There also exists a need for a hand-worn article that provides protection for the user of the device when used to brush the teeth of a human.

There further exists a need for a hand-worn article that provides protection for the user of the device when used for household cleaning purposes.

There also exists a need for a hand-worn article that provides protection for the user of the device that is inexpensive to manufacture and easy to use.

The applicants are unaware of any articles, either by themselves or in combination with others, that anticipate or suggest the article disclosed and claimed herein.

SUMMARY OF THE INVENTION

Accordingly, it is an object of the invention to provide a hand-worn article that is easy to put on and take off.

It is another object of the invention to provide a hand-worn article that is easy to use.

A further object of the invention is to provide a hand-worn article that is inexpensive to manufacture and package.

It is yet another object of the invention to provide a hand-worn article that is firmly secured to the hand of the user and cannot be easily dislodged.

Another object of the invention is to provide a hand-worn article that provides protection for the user from infectious and harmful substances.

A further object of the invention is to provide a hand-worn article that provides sanitary protection for a living being on whom the device is being applied.

Another object of the invention is to provide a hand-worn article that may be used to brush the teeth of a living being.

Still another object of the invention is to provide a hand-worn article that may be used for shampooing applications.

An additional object of the invention is to provide a hand-worn article for use in massaging applications.

It is yet another object of the invention to provide a hand-worn article for use in cleaning applications requiring abrasives.

A further object of the invention is to provide a hand-worn article where the cleaning or massaging portion of the article is integral with the hand covering portion of the article.

It is another object of the invention to provide a hand-worn article that is made of a material to which living beings are not allergic.

Still another object of the invention is to provide a hand-worn article that is disposable.

These and other objectives are achieved by the present invention, which, in a broad aspect, provides the user with a hand covering for wearing on the hand that may include one or more receptacles for the thumb or fingers of the human hand, and a plurality of raised elements on at least a portion of the hand covering that can be used for cleaning, brushing, polishing, massaging, and the like.

In the preferred embodiment of the invention, the invention is a hand covering article that takes on the appearance of a traditional glove that can be worn on the human hand and which includes receptacles for the thumb and each finger. On at least a portion of the front side of the glove are located a number of raised elements, such as bristles, massaging surfaces, or the like that may be used for cleaning, brushing or other applications. The back side of the glove is plain.

The glove may be constructed from a variety of materials. The applicants have found that a vinyl material works very well for the present application, as most humans and animals are not allergic to vinyl. The raised elements may be formed by injection molding and applied to the surface of the hand covering by means of a heat sealing process. The applicants have found that using an adhesive to attach the raised elements to the hand covering may create inconsistencies in construction of the hand covering and also may expose beings on which the article is used to potentially harmful substances.

While the raised elements may be attached to the hand covering at a number of locations, in the preferred embodiment of the invention, it has been found that locating the raised elements on the receptacles in proximity to the ends of the thumb, index finger, and middle finger are the best locations. Of course, for certain applications, such as household cleaning operations, it may be useful to attach the raised surfaces to portions of the receptacles of the other fingers or to portions of the hand covering in proximity to the palm of the hand. After use, the hand covering may be disposed.

An alternative embodiment of the invention includes a hand covering article of the present invention takes on the form of an autonomous covering for the hand with no separate and distinct receptacles for the thumb and/or fingers of the hand. In this embodiment of the invention, the raised elements may be located on all or a portion of the front surface of the hand covering.

In another embodiment of the invention, the hand covering article takes on the appearance of a mitten, with a distinctive receptacle for the thumb. In this embodiment of the invention, the raised elements may be attached to all or a portion of the thumb and to a portion of the front of the hand covering article.

In yet another embodiment of the invention, the hand covering article includes a distinctive receptacle for one or more fingers, while the rest of the fingers and the thumb of the hand are contained within the remainder of the hand covering. In this embodiment of the invention, the raised elements may be attached to all or a portion of the front of the finger receptacle and/or all or a portion of the front of the remainder of the hand covering article.

Further objects and advantages of this invention will become more apparent from the following description of the preferred embodiments, which, taken in conjunction with the accompanying drawings, will illustrate, by way of example, the principles of the invention.

BRIEF DESCRIPTION OF THE DRAWINGS

The foregoing and other objects, aspects and advantages of the invention will be better understood from the following detailed description of the preferred embodiments of the invention with reference to the drawings in which:

FIG. 1 illustrates a front elevation of an exemplary article in accordance with the present invention;

FIG. 2 illustrates rear elevation of an exemplary article in accordance with the present invention;

FIG. 5 illustrates a front elevation of a third embodiment of an exemplary article in accordance with the present invention;

FIG. 6 illustrates a rear elevation of a third embodiment of an exemplary article in accordance with the present invention;

DETAILED DESCRIPTION OF THE PREFERRED EMBODIMENTS OF THE INVENTION

Figure 3:
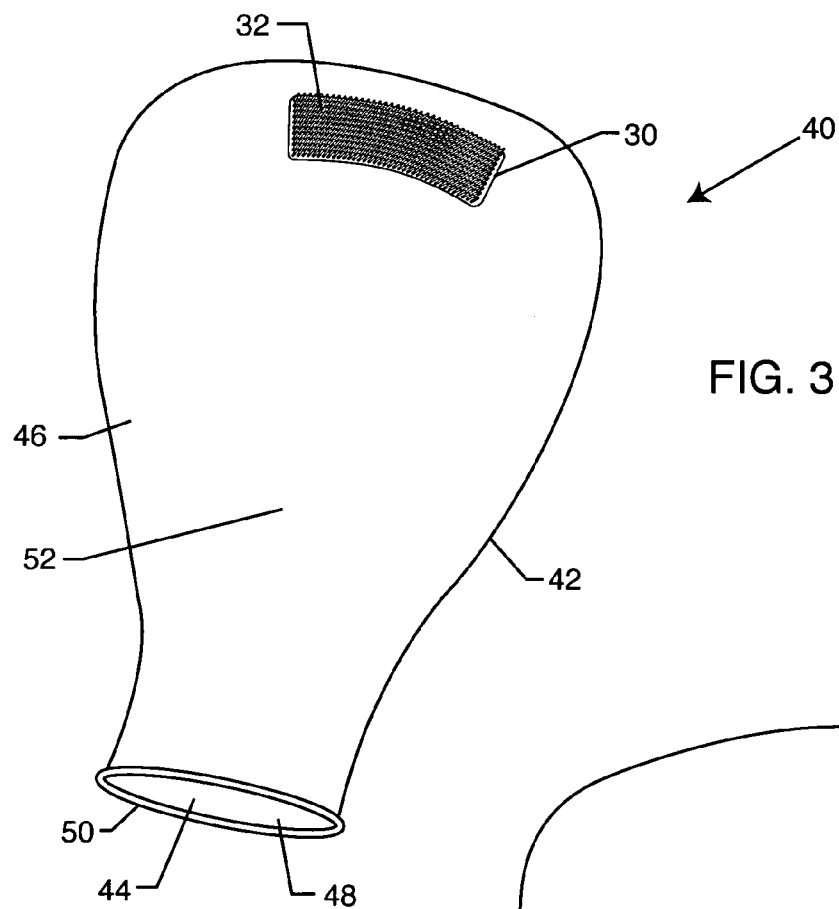
FIG. 3 illustrates a front elevation of a second embodiment of an exemplary article in accordance with the present invention.

In the following description of the present invention, reference is made to the accompanying drawings, which form a part thereof, and in which are shown, by way of illustration, exemplary embodiments illustrating the principles of the present invention and how it may be practiced.

It is to be understood that other embodiments may be utilized to practice the present invention and structural and functional changes may be made thereto without departing from the scope of the present invention.

An article in accordance with the present invention is referred to by the reference numeral 10. As generally illustrated in FIGS. 1 and 2, article 10 is configured as a covering for the human hand and, in the preferred embodiment of the invention, takes on the form of a glove. Hand enclosure 12 has a seamless construction, is preferably made from a disposable vinyl material, and is configured with an outer surface 14 and an inner surface 16. Hand enclosure 12 may be placed over the hand by inserting the hand into opening 18. After article 10 is used for its intended purpose, it may be disposed of.

Hand enclosure 12 further includes a thumb receptacle 26, in which is placed the thumb of the hand, and a plurality of finger receptacles 28. In the preferred embodiment of the invention, there is a separate finger receptacle 28 for each of the fingers on the hand, but those skilled in the art will understand that a different number of receptacles 28 may be used with the invention without departing from the scope of the invention.

Hand enclosure 12 further includes front 22 and back 24. On front 22 of hand enclosure 12 are located one or more pads 30, which are heat sealed to outer surface 14, and which each include a plurality of raised elements 32, which may take on the form of bristles, massaging elements, or the like, to perform a number of brushing or cleaning functions. As illustrated in FIG. 1, raised elements 32 are located on thumb receptacle 26 and on two finger receptacles 28. Those skilled in the art will recognize that other locations for the raised elements are possible without departing from the scope of the invention.

In the preferred embodiment of the invention, raised elements 32 take on the form of bristles for brushing and are constructed from a polymer, such as polyurethane. Generally, raised elements 32 are oriented in a generally perpendicular direction to the plane of pad 30. Securing means 20, which may take on the form of an elastic cord, is located in proximity to opening 18, and provides a tight seal which helps to secure article 10 to the hand and keep fluids from entering or leaving hand enclosure 12, thereby protecting the user and/or a person or animal on which article 10 is being applied from exposure to infections caused by the transfer of fluids.

Figure 4:
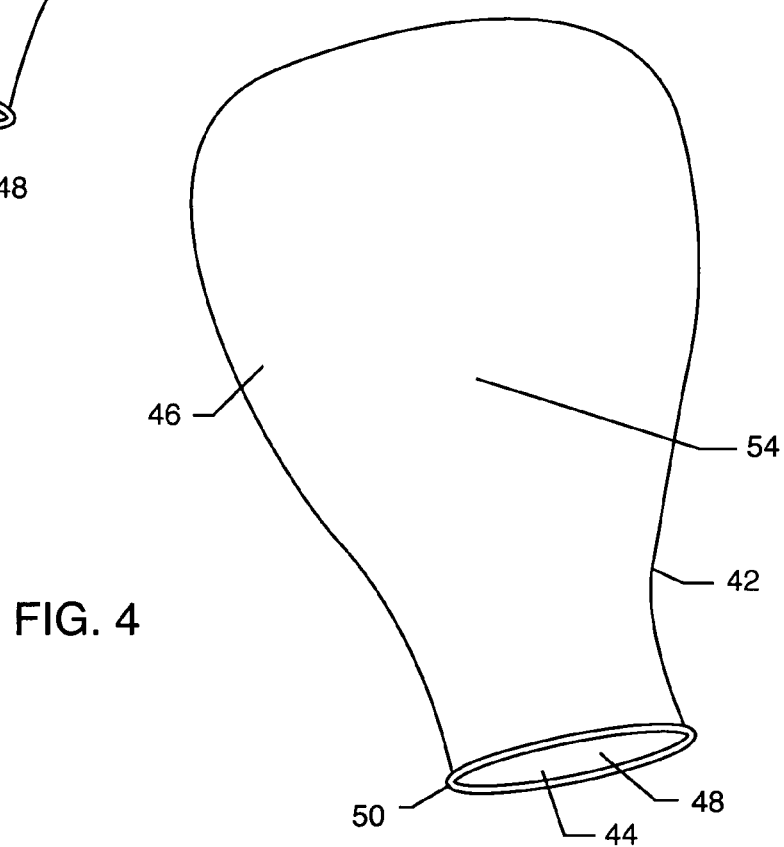
FIG. 4 illustrates a rear elevation of a second embodiment of an exemplary article in accordance with the present invention.

FIGS. 3 and 4 illustrate a second embodiment 40 of the invention. In this embodiment of the invention, second embodiment 40 is embodied in a hand enclosure 42 having an inner surface 44 and an outer surface 46. In this embodiment of the invention, there are no individual receptacles for the fingers or thumb of the hand.

Hand enclosure 42 is mounted on the hand by sliding the hand through opening 48 and secured to the hand by securing means 50, which may take on the form of an elastic cord. Hand enclosure 42 also includes front 52 and back 54.

Located on a portion of hand enclosure 42 are one or more pads 30, on each of which are attached a plurality of raised elements 32, which may take on the form of brushing bristles or massage surfaces and the like. Raised elements 32 are oriented in a generally perpendicular direction to outer surface 46 and may be located at a variety of locations on hand enclosure 42. Pad 30 is attached to hand enclosure 42 by means of heat sealing.

FIGS. 5 and 6 illustrate a third embodiment 70 of the present invention. In this third embodiment 70, hand enclosure 72 takes on the general appearance of a mitten. Hand enclosure 72 further includes outer surface 74 and inner surface 76. To mount hand enclosure 72 on the hand, the hand is inserted into opening 78. Hand enclosure 72 is secured to the hand and sealed by securing means 80, which may take on the form of an elastic cord. Hand enclosure 72 further includes a thumb receptacle 86 in which is inserted the thumb of a hand, and finger receptacle 88, in which are inserted the fingers of a hand.

Hand enclosure 72 further includes front 82 and back 84. On a portion of front 82 are mounted one or more pads 30, each of which includes a plurality of raised elements 32, which may take on the form of brushing bristles or massage surfaces and the like. Pads 30 and raised elements 32 may be mounted on thumb receptacle 86 and/or finger receptacle 88, as well as other parts of outer surface 74. Raised elements 32 are oriented in a generally perpendicular direction in relation to outer surface 74 and may be located in a variety of locations on hand enclosure 72. Pad 30 is attached to hand enclosure 42 by means of heat sealing.

Figures 7, 8:
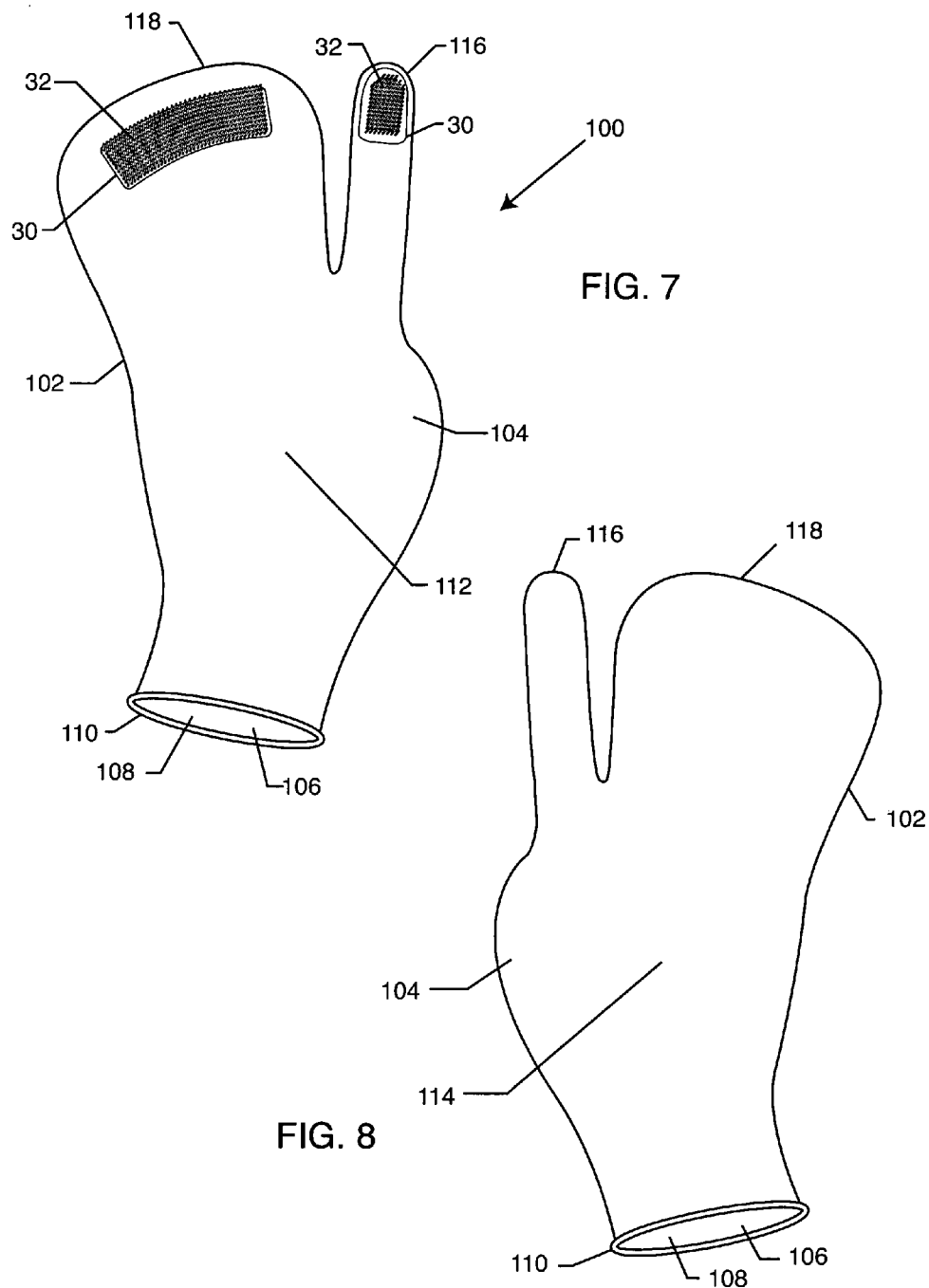
FIG. 7 illustrates a front elevation of a fourth embodiment of an exemplary article in accordance with the present invention.
FIG. 8 illustrates a rear elevation of a fourth embodiment of an exemplary article in accordance with the present invention.

FIGS. 7 and 8 illustrate a fourth embodiment 100 of the invention. In this fourth embodiment 100, hand enclosure 102 is embodied in an enclosure having an extension. Hand enclosure 102 further includes outer surface 104 and inner surface 106. To mount hand enclosure 102 on the hand, the hand is inserted into opening 108. Hand enclosure 102 is secured to the hand by securing means 110, which may take on the form of an elastic cord.

Hand enclosure 102 further includes a finger receptacle 116 in which is inserted one or more fingers of a hand, and chamber 118, in which are inserted the thumb and remaining fingers of a hand.

Hand enclosure 102 further includes front 112 and back 114. On a portion of front 112 are mounted one or more pads 30, each of which includes a plurality of raised elements 32, which may take on the form of brushing bristles or massage surfaces and the like. Pads 30 and raised elements 32 may be mounted on finger receptacle 116 and/or chamber 118, as well as other parts of outer surface 104. Raised elements 32 are oriented generally perpendicular direction in relation to outer surface 104 and may be located at a variety of locations on hand enclosure 102. Pad 30 is attached to hand enclosure 102 by means of heat sealing.

Figure 9:
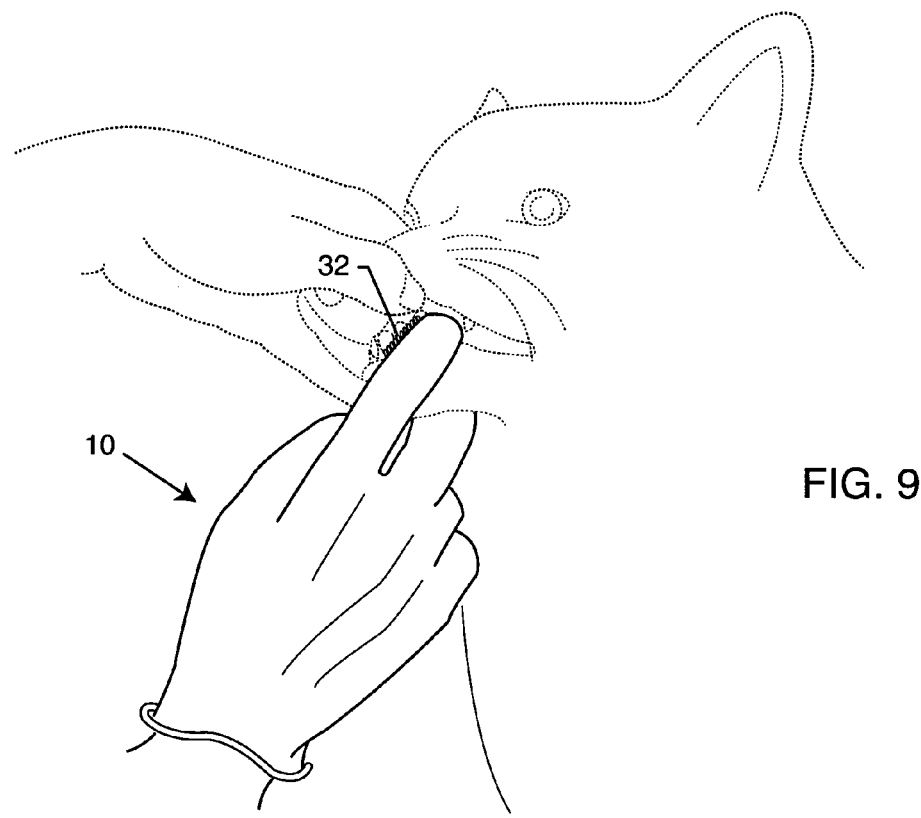
FIG. 9 illustrates a perspective view of a user brushing the teeth of a dog by using an exemplary article in accordance with the present invention.

FIG. 9 illustrates one of the many uses of present invention, where article 10 is shown as a means of brushing the teeth or massaging the gums of a pet; however, any of the other embodiments 40, 70 or 100 may be used in much the same fashion.

Figure 10:
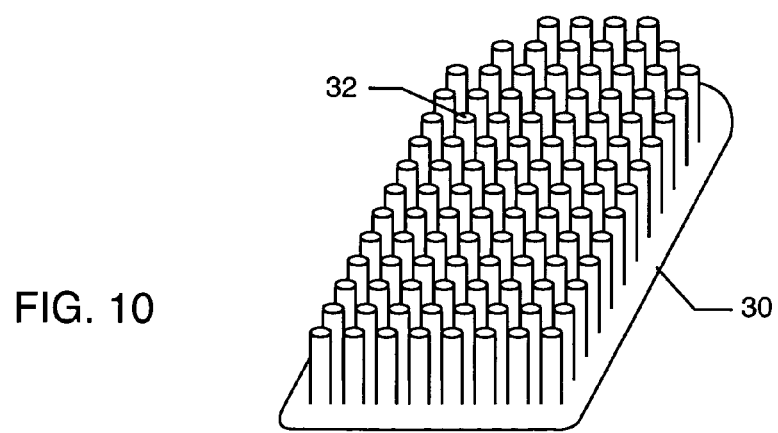
FIG. 10 illustrates a perspective view of the raised elements and element mounting base for use in an exemplary article in accordance with the present invention.

FIG. 10 illustrates in detail pad 30 and raised elements 32. Pad 30 and raised elements 32 are constructed of a polymer, such as polyurethane, and are formed by injection molding. Raised elements 32 may take on the form of brushes, bristles, massaging elements, abrasive scrubbers, and the like. Pad 30 and raised elements 32 are attached by means of heat sealing to the outer surface of the hand enclosure of the embodiments of the present invention.

The foregoing description of exemplary embodiments of the present invention has been presented for purposes of enablement, illustration, and description. It is not intended to be exhaustive of or to limit the present invention to the precise forms discussed. There are, however, other configurations for hand-worn articles suitable for use in brushing or cleaning applications not specifically described herein, but with which the present invention is applicable. The present invention should therefore not be seen as limited to the particular embodiments described herein; rather, it should be understood that the present invention has wide applicability with respect to hand-worn brushing and cleaning articles. Such other configurations can be achieved by those skilled in the art in view of the description herein. Accordingly, the scope of the invention is defined by the following claims.

What is claimed is:

1. A hand-worn article for cleaning the teeth and overall dental hygiene of a young person comprising:
    a hollow, seamless hand enclosure having an outer surface, an inner surface, a front face and a rear face;
    an opening in said hand enclosure for inserting the fingers; and
    a plurality of raised elements attached to a portion of said hand enclosure disposed near the tips of only the thumb, index finger, and middle finger on the front face and extending in a substantially perpendicular direction in relation to said outer surface.

2. The article according to claim 1, wherein said raised elements are comprised of bristles.

3. The article according to claim 1, wherein said raised elements are attached to said outer surface by means of heat sealing.

4. The article according to claim 1, wherein said raised elements are comprised of massaging surfaces.

5. The article according to claim 1, wherein said raised elements are further comprised of polishing surfaces.

6. The articles according to claim 1, wherein said opening includes sealing means to prevent the ingress of fluids into and the egress of fluids from said enclosure.

7. The article according to claim 1, wherein said hand enclosure is constructed of a disposable material.

8. The article according to claim 1, wherein said hand enclosure is constructed of elastomeric material.

9. A hand-worn article for cleaning the teeth and overall dental hygiene of a young person comprising:
    a hollow, seamless hand enclosure having an outer surface, an inner surface, a front face and a rear face, the hand enclosure being a mitten having a thumb receptacle and a finger receptacle;
    an opening in said enclosure for inserting a hand; and
    a plurality of raised elements attached to a portion of said hand enclosure disposed near the tips of only the thumb, index finger, and middle finger on the front face and extending in a substantially perpendicular direction in relation to said outer surface.

10. The article according to claim 9, wherein said raised elements are comprised of bristles.

11. The article according to claim 9, wherein said raised elements are attached to said outer surface by means of heat sealing.

12. The article according to claim 9, wherein said raised elements are comprised of massaging elements.

13. The article according to claim 9, wherein said raised elements are comprised of polishing surfaces.

14. The article according to claim 9, wherein said opening includes sealing means to prevent the ingress of fluids into and the egress of fluids from out of said enclosure.

15. The article according to claim 9, wherein said hand enclosure is constructed of an elastomeric material.

16. The article according to claim 9, wherein said hand enclosure is constructed of a disposable material.

17. A hand-worn article for cleaning the teeth and overall dental hygiene of a young person comprising:
    a hollow, seamless hand enclosure having an outer surface an inner surface, a front face and a rear face, the hand enclosure having a receptacle for the index finger and a chamber for the thumb and other fingers of a hand;

an opening in said enclosure for inserting a hand; and a plurality of raised elements attached to a portion of said hand enclosure disposed near the tips of only the thumb, index finger, and middle finger on the front face and extending in a substantially perpendicular direction in relation to said outer surface.

18. The article according to claim 17, wherein said raised elements are comprised of bristles.

19. The article according to claim 17, wherein said raised elements are attached to said outer surface by means of heat sealing.

20. The article according to claim 17, wherein said raised elements are comprised of massaging elements.

21. The article according to claim 17, wherein said raised elements are comprised of polishing surfaces.

22. The article according to claim 17, wherein said opening includes sealing means to prevent the ingress of fluids into and the egress of fluids from out of said enclosure.

23. The article according to claim 17, wherein said hand enclosure is constructed of an elastomeric material.

* * * * *